(12) United States Patent
Massand

(10) Patent No.: US 10,025,782 B2
(45) Date of Patent: Jul. 17, 2018

(54) SYSTEMS AND METHODS FOR MULTIPLE DOCUMENT VERSION COLLABORATION AND MANAGEMENT

(71) Applicant: LITERA CORPORATION, McLeansville, NC (US)

(72) Inventor: Deepak Massand, McLeansville, NC (US)

(73) Assignee: Litera Corporation, McLeansville, NC (US)

( * ) Notice: Subject to any disclaimer, the term of this patent is extended or adjusted under 35 U.S.C. 154(b) by 220 days.

(21) Appl. No.: 13/920,135

(22) Filed: Jun. 18, 2013

(65) Prior Publication Data

US 2014/0372370 A1  Dec. 18, 2014

(51) Int. Cl.
G06F 17/30 (2006.01)

(52) U.S. Cl.
CPC .... *G06F 17/30011* (2013.01); *G06F 17/3023* (2013.01); *G06F 17/30126* (2013.01)

(58) Field of Classification Search
CPC ......... G06F 17/30011; G06F 17/30309; G06F 17/3023; G06F 17/30091
USPC ................................................. 707/607–609
See application file for complete search history.

(56) References Cited

U.S. PATENT DOCUMENTS

| | | | |
|---|---|---|---|
| 3,920,895 A | 11/1975 | Vieri et al. | |
| 3,920,896 A | 11/1975 | Bishop et al. | |
| 5,008,853 A | 4/1991 | Bly et al. | |
| 5,129,082 A | 7/1992 | Tirfing et al. | |
| 5,146,552 A | 9/1992 | Cassorla et al. | |
| 5,204,947 A | 4/1993 | Bernstein et al. | |
| 5,253,362 A | 10/1993 | Nolan et al. | |
| 5,315,504 A | 5/1994 | Lemble | |
| 5,321,505 A | 6/1994 | Leddy | |
| 5,341,469 A | 8/1994 | Rossberg et al. | |
| 5,515,491 A | 5/1996 | Bates et al. | |
| 5,539,871 A | 7/1996 | Gibson | |
| 5,581,682 A | 12/1996 | Anderson et al. | |
| 5,596,700 A | 1/1997 | Darnell et al. | |

(Continued)

OTHER PUBLICATIONS

Basu et al, "Efficient Virtual Memory for Big Memory Servers," *ACM*, pp. 1-12 (2013).

(Continued)

*Primary Examiner* — Monica Pyo
(74) *Attorney, Agent, or Firm* — Finnegan, Henderson, Farabow, Garrett & Dunner LLP

(57) ABSTRACT

Systems and methods consistent with various disclosed embodiments provide for managing and collaborating information over a computer network. In one embodiment, a system is disclosed for managing documents over a network. The system may include a storage device and one or more processors. The processor(s) may receive a first version of a document from a client. The processor(s) may create, in a document log, an entry associated with the first version of the document. The processor(s) may receive a request from a remote computer that is displaying in an interface a second version of the document, and the request may include a request for information from one or more entries in the document log. The processor(s) may provide to the remote computer, for displaying in a display window in the interface, information from one or more entries in the document log.

16 Claims, 7 Drawing Sheets

(56) References Cited

U.S. PATENT DOCUMENTS

| | | |
|---|---|---|
| 5,596,705 A | 1/1997 | Reimer et al. |
| 5,659,676 A | 8/1997 | Redpath |
| 5,664,208 A | 9/1997 | Pavley et al. |
| 5,669,005 A | 9/1997 | Curbow et al. |
| 5,671,428 A | 9/1997 | Muranaga et al. |
| 5,694,544 A | 12/1997 | Tanigawa et al. |
| 5,706,452 A | 1/1998 | Ivanov |
| 5,706,502 A | 1/1998 | Foley et al. |
| 5,708,826 A | 1/1998 | Ikeda et al. |
| 5,708,845 A | 1/1998 | Wistendahl et al. |
| 5,740,444 A | 4/1998 | Frid-Nielsen |
| 5,752,055 A | 5/1998 | Redpath et al. |
| 5,758,313 A | 5/1998 | Shah et al. |
| 5,761,419 A | 6/1998 | Schwartz et al. |
| 5,761,499 A | 6/1998 | Sonderegger |
| 5,781,732 A | 7/1998 | Adams |
| 5,781,901 A | 7/1998 | Kuzma |
| 5,787,175 A | 7/1998 | Carter |
| 5,799,191 A | 8/1998 | Moriyasu et al. |
| 5,801,702 A | 9/1998 | Dolan et al. |
| 5,809,512 A | 9/1998 | Kato |
| 5,860,073 A | 1/1999 | Ferrel et al. |
| 5,864,870 A | 1/1999 | Guck |
| 5,870,754 A | 2/1999 | Dimitrova et al. |
| 5,878,421 A | 3/1999 | Ferrel et al. |
| 5,890,177 A | 3/1999 | Moody et al. |
| 5,893,126 A | 4/1999 | Drews et al. |
| 5,911,776 A | 6/1999 | Guck |
| 5,931,906 A | 8/1999 | Fidelibus, Jr. et al. |
| 5,937,066 A | 8/1999 | Gennaro et al. |
| 5,938,724 A | 8/1999 | Pommier et al. |
| 5,944,785 A | 8/1999 | Pommier et al. |
| 5,949,413 A | 9/1999 | Lerissa et al. |
| 5,950,214 A | 9/1999 | Rivette et al. |
| 5,956,736 A | 9/1999 | Hanson et al. |
| 5,958,006 A | 9/1999 | Eggleston et al. |
| 5,978,836 A | 11/1999 | Ouchi |
| 5,987,469 A | 11/1999 | Lewis et al. |
| 6,009,462 A | 12/1999 | Birrell et al. |
| 6,014,135 A | 1/2000 | Fernandes |
| 6,029,171 A | 2/2000 | Smiga et al. |
| 6,064,751 A | 5/2000 | Smithies et al. |
| 6,067,551 A | 5/2000 | Brown et al. |
| 6,088,702 A | 7/2000 | Plantz et al. |
| 6,088,709 A | 7/2000 | Watanabe |
| 6,092,090 A | 7/2000 | Payne et al. |
| 6,119,147 A | 9/2000 | Toomey et al. |
| 6,158,903 A | 12/2000 | Schaeffer et al. |
| 6,178,431 B1 | 1/2001 | Douglas |
| 6,182,080 B1 | 1/2001 | Clements |
| 6,212,534 B1 | 4/2001 | Lo et al. |
| 6,230,171 B1 | 5/2001 | Pacifici et al. |
| 6,243,722 B1 | 5/2001 | Day et al. |
| 6,263,340 B1 | 7/2001 | Green |
| 6,275,223 B1 | 8/2001 | Hughes |
| 6,289,460 B1 | 9/2001 | Hajmiragha |
| 6,317,777 B1 | 11/2001 | Skarbo et al. |
| 6,332,144 B1 | 12/2001 | deVries et al. |
| 6,334,141 B1 | 12/2001 | Varma et al. |
| 6,336,134 B1 | 1/2002 | Varma |
| 6,343,313 B1 | 1/2002 | Salesky et al. |
| 6,353,817 B1 | 3/2002 | Jacobs et al. |
| 6,360,236 B1 | 3/2002 | Khan et al. |
| 6,363,352 B1 | 3/2002 | Dailey et al. |
| 6,411,989 B1 | 6/2002 | Anupam et al. |
| 6,502,113 B1 | 12/2002 | Crawford et al. |
| 6,551,357 B1 | 4/2003 | Madduri |
| 6,560,637 B1 | 5/2003 | Dunlap et al. |
| 6,572,661 B1 | 6/2003 | Stern |
| 6,590,584 B1 | 7/2003 | Yamaura et al. |
| 6,643,663 B1 | 11/2003 | Dabney et al. |
| 6,687,878 B1 | 2/2004 | Eintracht et al. |
| 6,708,172 B1 | 3/2004 | Wong et al. |
| 6,785,676 B2 | 8/2004 | Oblinger |
| 7,007,232 B1 | 2/2006 | Ross et al. |
| 7,054,812 B2 | 5/2006 | Charlesworth et al. |
| 7,072,940 B1 | 7/2006 | Day et al. |
| 7,194,679 B1 | 3/2007 | Green |
| 7,251,680 B2 | 7/2007 | DeVos |
| 7,277,901 B2 | 10/2007 | Parker et al. |
| 7,299,257 B2 | 11/2007 | Boyer et al. |
| 7,424,543 B2 | 9/2008 | Rice |
| 7,478,170 B2 | 1/2009 | Ong et al. |
| 7,499,956 B1 | 3/2009 | Darcy et al. |
| 7,818,660 B2 | 10/2010 | Massand |
| 7,818,678 B2 * | 10/2010 | Massand ............. G06F 17/2229 |
| | | 715/751 |
| 7,848,984 B1 | 12/2010 | Robb |
| 7,890,405 B1 | 2/2011 | Robb |
| 7,895,276 B2 | 2/2011 | Massand |
| 7,933,952 B2 | 4/2011 | Parker et al. |
| 8,024,802 B1 | 9/2011 | Preston |
| 8,136,031 B2 * | 3/2012 | Massand ............. G06F 17/2211 |
| | | 715/212 |
| 8,209,278 B1 * | 6/2012 | Straus ............................ 706/62 |
| 8,856,237 B2 * | 10/2014 | Spataro ................ G06Q 10/10 |
| | | 709/205 |
| 8,881,013 B2 | 11/2014 | Lyons et al. |
| 2001/0034845 A1 | 10/2001 | Brunt et al. |
| 2001/0037367 A1 | 11/2001 | Iyer |
| 2001/0037460 A1 | 11/2001 | Porcari |
| 2002/0022960 A1 | 2/2002 | Charlesworth et al. |
| 2002/0049786 A1 | 4/2002 | Bibliowicz et al. |
| 2002/0059342 A1 | 5/2002 | Gupta et al. |
| 2002/0059343 A1 | 5/2002 | Kurishima et al. |
| 2002/0065848 A1 | 5/2002 | Walker et al. |
| 2002/0078088 A1 | 6/2002 | Kuruoglu et al. |
| 2002/0085030 A1 | 7/2002 | Ghani |
| 2002/0091725 A1 | 7/2002 | Skok |
| 2002/0105532 A1 | 8/2002 | Oblinger |
| 2002/0107886 A1 | 8/2002 | Gentner et al. |
| 2002/0133628 A1 | 9/2002 | Asplund et al. |
| 2002/0143691 A1 | 10/2002 | Ramaley et al. |
| 2002/0184160 A1 | 12/2002 | Tadayon et al. |
| 2002/0184517 A1 | 12/2002 | Tadayon et al. |
| 2003/0112273 A1 | 6/2003 | Hadfield et al. |
| 2003/0158855 A1 | 8/2003 | Farnham et al. |
| 2003/0182450 A1 | 9/2003 | Ong et al. |
| 2003/0197730 A1 | 10/2003 | Kakuta et al. |
| 2003/0226116 A1 | 12/2003 | Kuwata et al. |
| 2004/0034688 A1 | 2/2004 | Dunn |
| 2004/0085354 A1 | 5/2004 | Massand |
| 2004/0205653 A1 | 10/2004 | Hadfield et al. |
| 2004/0260714 A1 | 12/2004 | Chatterjee et al. |
| 2004/0267798 A1 | 12/2004 | Chatterjee et al. |
| 2005/0060643 A1 | 3/2005 | Glass et al. |
| 2005/0216457 A1 | 9/2005 | Walther et al. |
| 2006/0048224 A1 | 3/2006 | Duncan |
| 2006/0167879 A1 | 7/2006 | Umeki et al. |
| 2006/0253482 A1 | 11/2006 | Zellweger et al. |
| 2006/0282762 A1 | 12/2006 | Diamond et al. |
| 2006/0291727 A1 | 12/2006 | Bargeron |
| 2007/0055926 A1 | 3/2007 | Christiansen et al. |
| 2007/0157287 A1 | 7/2007 | Lim |
| 2007/0186157 A1 | 8/2007 | Walker et al. |
| 2007/0282660 A1 | 12/2007 | Forth |
| 2008/0034275 A1 | 2/2008 | Edd et al. |
| 2008/0065848 A1 | 3/2008 | Majors et al. |
| 2008/0080017 A1 * | 4/2008 | Ishizuka ............. G06F 17/2288 |
| | | 358/452 |
| 2008/0133673 A1 | 6/2008 | Abdelhadi et al. |
| 2008/0292213 A1 | 11/2008 | Chau |
| 2009/0006936 A1 | 1/2009 | Parker et al. |
| 2009/0249291 A1 | 10/2009 | Bak et al. |
| 2010/0174678 A1 | 7/2010 | Massand |
| 2010/0189318 A1 | 7/2010 | Chang et al. |
| 2010/0235763 A1 | 9/2010 | Massand |
| 2010/0251104 A1 | 9/2010 | Massand |
| 2010/0257457 A1 * | 10/2010 | De Goes ................ G06Q 10/10 |
| | | 715/751 |
| 2011/0004621 A1 | 1/2011 | Kelley |
| 2011/0016387 A1 | 1/2011 | Mundy et al. |
| 2011/0035421 A1 | 2/2011 | Laird-McConnell et al. |
| 2011/0043844 A1 * | 2/2011 | Fukuoka ........................ 358/1.13 |

(56) References Cited

U.S. PATENT DOCUMENTS

| | | |
|---|---|---|
| 2011/0055177 A1 | 3/2011 | Chakra et al. |
| 2011/0137947 A1 | 6/2011 | Dawson et al. |
| 2011/0252312 A1 | 10/2011 | Lemonik et al. |
| 2011/0264745 A1 | 10/2011 | Ferlitsch |
| 2011/0276919 A1* | 11/2011 | Massand ............ G06F 9/44526 715/810 |
| 2012/0060082 A1 | 3/2012 | Edala |
| 2012/0096342 A1 | 4/2012 | Wang |
| 2012/0101980 A1 | 4/2012 | Taleghani et al. |
| 2012/0124092 A1 | 5/2012 | Teranishi et al. |
| 2012/0185759 A1 | 7/2012 | Balinksy et al. |
| 2012/0192055 A1 | 7/2012 | Antebi et al. |
| 2012/0284617 A1 | 11/2012 | Nouard et al. |
| 2012/0284618 A1 | 11/2012 | Bailor et al. |
| 2012/0296790 A1 | 11/2012 | Robb |
| 2013/0031147 A1 | 1/2013 | Ghods et al. |
| 2013/0080545 A1 | 3/2013 | Datta |
| 2013/0111544 A1 | 5/2013 | Balinksy et al. |
| 2013/0218829 A1* | 8/2013 | Martinez ....................... 707/608 |
| 2013/0246901 A1 | 9/2013 | Massand |
| 2013/0321083 A1 | 12/2013 | Huang et al. |
| 2014/0033067 A1 | 1/2014 | Pittenger et al. |
| 2014/0033068 A1 | 1/2014 | Gupta et al. |
| 2014/0096186 A1 | 4/2014 | Barton et al. |
| 2014/0237626 A1 | 8/2014 | Marcus et al. |
| 2014/0372370 A1* | 12/2014 | Massand ....................... 707/608 |
| 2014/0373108 A1 | 12/2014 | Bailor et al. |
| 2015/0127376 A1* | 5/2015 | Ortenzi ................ A61M 5/007 705/3 |
| 2015/0378974 A1 | 12/2015 | Massand |

OTHER PUBLICATIONS

Goldman, "Role-Based Interfaces for Collaborative Software Development," *ACM*, pp. 23-26 (2011).

Declaration under 37 C.F.R. § 1.131 and 37 C.F.R. § 1.132 of Deneen Martinez (Jun. 6, 2014).

Complaint in *Litera Corp. v. Deneen Martinez*, No. 14-CVS-6387 (N.C. Sup. Ct., Guilford County, Jun. 9, 2014).

Answer and Counterclaims and Third-Party Complaint of Deneen Martinez in *Litera Corp. v. Deneen Martinez*, No. 14-CVS-6387 (N.C. Sup. Ct., Guilford County, Sep. 2, 2014).

Letter re: U.S. Appl. No. 13/423,805 to Litera/ Deepak Massand (3 pages) dated Dec. 2, 2015.

Workshare® Professional User Guide, p. 13 (3 pages).

Workshare® Professional 4 SharePoint Release Notes (6 pages).

Workshare® Professional Version 4 Getting Started Guide (15 pages).

Tsai et al., "A document Workspace for Collaboration and Annotation based on XML Technology," *Multimedia Software Engineering*, 2000. Proceedings. International Symposium on. IEEE, 2000.

\* cited by examiner

SYSTEMS AND METHODS FOR MULTIPLE DOCUMENT VERSION COLLABORATION AND MANAGEMENT

DESCRIPTION OF THE INVENTION

Field of the Invention

The disclosed embodiments generally relate to systems, methods, and articles of manufacture for managing and collaborating documents.

Background of the Invention

The versatility of the Internet for collaborative processes continues to drive the development of information and document management applications. Software products such as HyperOffice, Litéra Sync, WorkShare SkyDox, Dropbox, etc. provide users with the ability to save and share documents in a web- or cloud-based storage container where they and other invited users can access, review, edit, change, and otherwise collaborate on these documents. With such products, a user may select and save a copy of a document from storage locations on their local computer or network or Document Management System (DMS) to a container located on the Web, where they can later access it from any device over the Internet or share it with others.

While these types of products provide remote access and sharing of documents, they do not provide enough versatility and convenience for efficiently managing and collaborating on documents. For example, conventional systems do not allow for the option for a reviewer to generate a display window that displays information associated with each version of a document, including the total number of versions, edits, comments, redline changes, user identity, timestamp, etc. Nor do such products track and recognize different versions of documents, whether stored in local memory on a device, or non-local memory on a network or in a DMS, and provide such information for display during collaborative document review and editing processes.

Accordingly, there is a need for a method and system that tracks and recognizes different versions of documents regardless of storage location, and provides information regarding each existing version during a collaborative review process.

SUMMARY OF THE INVENTION

The disclosed embodiments provide, among other things, improved systems and methods of managing and collaborating information over a computer network.

The disclosed embodiments include, for example, a system for managing documents over a network. In one embodiment, the system may include a storage device storing software instructions and one or more processors configured to execute the software instructions to perform operations consistent with the disclosed embodiments. The one or more processors may receive a first version of a document from a first client. The one or more processors may also create, in a document log, an entry associated with the first version of the document. The document log may contain multiple entries, with each entry corresponding to a different version of the document. The one or more processors may also receive a request from a remote computer that is displaying in an interface a second version of the document, and the request may include a request for information from one or more entries in the document log. The one or more processors may additionally provide to the remote computer, for displaying in a display window in the interface, information from one or more entries in the document log.

The disclosed embodiments may also include a computer-implemented process for managing documents. In one embodiment, the process may include receiving a first version of a document from a first client. The process may also include creating an entry associated with the first version of the document in a document log. The document log may contain multiple entries, with each entry corresponding to a different version of the document. The process may further include receiving a request from a remote computer that is displaying in an interface a second version of the document, and the request may include a request for information from one or more entries in the document log. The process may additionally include providing to the remote computer, for displaying in a display window in the interface, information from one or more entries in the document log.

The disclosed embodiments may also include another system for managing documents. The system may include a storage device storing software instructions, and one or more processors configured to execute the software instructions. The one or more processors may provide to a document collaboration platform, a first version of a document. The one or more processors may also display, in an interface, a second version of the document. The one or more processors may also send to the document management platform a request for information from one or more entries in a document log, wherein the document log contains multiple entries, with each entry corresponding to a different version of the document. The process may also include providing to the remote computer, for displaying in a display window in the interface, information from one or more entries in the document log. The one or more processors may further display, in a display window in the interface, information from one or more entries in the document log.

The disclosed embodiments may also include another process for managing documents. In one embodiment, the process may include providing, to a document collaboration platform, a first version of a document. The process may also include displaying, in an interface, a second version of the document. The process may additionally include sending, to the document management platform, a request for information from one or more entries in a document log, wherein the document log contains multiple entries, each entry corresponding to a different version of the document. The process may further include displaying, in a display window in the interface, information from one or more entries in the document log.

Additional objects and advantages of the disclosed embodiments will be set forth in part in the description which follows, and in part will be obvious from the description, or may be learned by practice of the embodiments. The objects and advantages of the disclosed embodiments may be realized and attained by means of the elements and combinations particularly pointed out in the appended claims.

It is to be understood that both the foregoing general description and the following detailed description are exemplary and explanatory only and are not restrictive of the disclosed embodiments, as claimed. Further features and/or variations may be provided in addition to those set forth herein. For example, the disclosed embodiments may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, illustrate various embodiments and aspects of the present invention. In the drawings.

DESCRIPTION OF THE EMBODIMENTS

Reference will now be made in detail to the exemplary disclosed embodiments, examples of which are illustrated in the accompanying drawings. Wherever possible, the same reference numbers will be used throughout the drawings to refer to the same or like parts.

Figure 1:
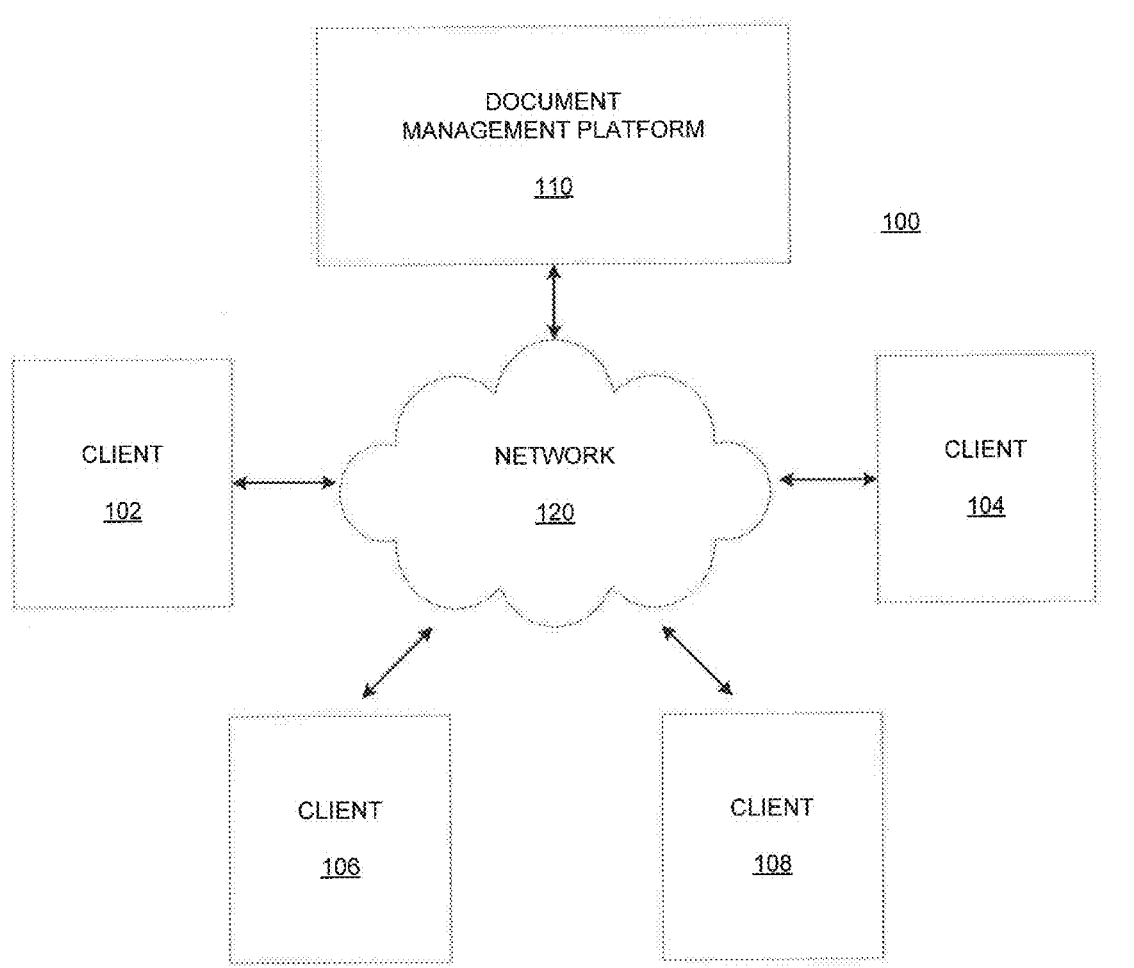
FIG. 1 illustrates an exemplary system environment for implementing certain embodiments.

FIG. 1 illustrates an exemplary system environment 100 consistent with certain disclosed embodiments. In one example, system 100 provides a collaboration environment where one or more client systems 102, 104, 106, and 108 are connected to a network 120. In certain embodiments, client systems 102, 104, 106, and 108 can share, edit, make changes, comment on, and annotate information in document tracked and monitored by a document management platform 110. In certain embodiments, system 100 enables a user to share information, for example, by creating documents, or by editing, changing, commenting on, or annotating pre-existing documents within the system environment 100.

Client 102, 104, 106, 108 may each be one or more computer systems including one or more computing components for performing one or more processes consistent with certain aspects of the disclosed embodiments. In one embodiment, client 102, 104, 106, 108 may each include one or more computer or data processing devices that have hardware (e.g., one or more processors, storage memory, data buses, network interface, etc.), software (e.g., web browsers, application programs, operating systems, other executable program code written in any known programming language such as PL/SQL, AJAX, XML, JavaScript™, C, C++, Java™, etc.), and/or firmware (e.g., software embedded in a hardware device). Client 102, 104, 106, and/or 108 may be configured to communicate with one or more networks, such as network 120, and with other clients, servers, or other platforms, devices, or components connected to network 120 (e.g., in the cloud), or other computers or components connected to a local network (not shown).

Clients 102, 104, 106, and/or 108 may be associated with an entity, such as a company, organization, government agency, educational or medical facility, firm, or any other type of business or non-business entity. In certain embodiments, as one example, client 102 may be associated with an entity that is different from that associated with one or more of clients 104, 106, or 108. In other embodiments, clients 102, 104, 106, and 108 are each associated with a different entity. In still other embodiments, client 102 and one or more (or all) of clients 104, 106, 108 may be associated with the same entity. In still other embodiments, client 102 may be associated with a department, division, etc. of an entity that is different from a department, division, etc. of an entity associated with one or more of clients 104, 106, 108. In other embodiments, clients 102, 104, 106 and/or 108 may not be associated with any entity, and instead may be associated with a user having no affiliation with an entity (e.g., a personal computer device (e.g., computer, tablet, mobile device, etc.).

One or more users may operate one or more components of client 102, 104, 106, and/or 108 to perform one or more processes consistent with the disclosed embodiments when executed by software instructions stored on a respective client. In certain embodiments, client 102, 104, 106, 108 may execute software processes stored on tangible and non-transitory computer-readable mediums that perform one or more processes consistent with the disclosed embodiments. While FIG. 1 illustrates four clients 102, 104, 106, 108, aspects of the disclosed embodiments are not limited to such a configuration. Thus, the disclosed embodiments may be implemented with any number of clients interconnected by network 120. Further, the term "client" used herein to describe client 102, 104, 106, 108 is not intended to be limiting to a client in the sense of known client-server configurations, although such configurations may be implemented by the disclosed embodiments. For example, client 102, 104, 106, and/or 108 may be (or include) a server-type computer system or server software that may also request and receive information, data, services, processes, etc. from another computer system in a local and/or remote network.

In one embodiment, client 102, 104, 106, and/or 108 may create, maintain, edit, modify, copy, send, receive, store, save, delete, and the like, one or more documents. In one non-limiting example, a document may be an electronic document, such as a file, email, calendar, article, or other content or information that software, processors, and/or users may use. For example, a document may be a word processing document containing content (e.g., text, graphics, links, etc.). A document may also be a spreadsheet file, web page, PDF file, or any other type of file that includes content that may be viewed, edited, modified, copied, shared, etc, by a user, processor, or software. A document may also be stored, saved, located, and the like, in a memory on a tangible and non-transitory computer readable medium. Consistent with certain embodiments, such mediums may include local memory storage on various computers, servers, or devices, such as a desktop computer, laptop computer, home computer, work computer, mobile device, PDA, cell phone, smart phone, tablet, etc. Such mediums may also include non-local memory storage on various computers, servers, or devices, such as a network storage drive or a document management system (DMS), such as SharePoint®, Desksite®, Autonomy iManage, OpenText Tempo™, WorldDox®, NetDocuments®, DropBox, BOX, etc. While a document may be stored, saved, or located in the above-described examples of local and non-local memory storage, aspects of the disclosed embodiments are not limited to such examples and include other types of memory on a tangible and non-transitory computer readable medium known in the art.

In one embodiment, client 102, 104, 106, and/or 108 and/or its respective user(s) (or entity associated with client 102, 104, 106, 108) may be a creator or a reviewer. For example, a creator may be a user and/or associated client that creates, maintains, controls, or otherwise is an initiator of a document for the sharing and/or review of that document. A creator may share one or more documents through document management platform 110 in accordance with certain disclosed embodiments. A client, such as client 102, may be used by one or more creator users to create, modify, copy, delete, and/or share one or more documents. A reviewer may be a user and/or associated client that accesses, reviews, analyzes, modifies, comments on, annotates, edits, or otherwise works with a document shared by an creator in accordance with certain disclosed embodiments. For example, client 102 (and/or a user of client 102) may be a creator and client 104 (and/or a user of client 104) may be a reviewer of documents shared by client 102. Further, client 102 may be a reviewer of documents and/or folders shared by client 104. Other clients, such as clients 106, 108 (and others not shown) may also be implemented that each may be creators, reviewers, or both, respective to other clients.

In certain embodiments, any number of clients (and users) may share documents using document management platform 110. Thus, creators and reviewers may be individuals or groups of individuals with access to the document management platform 110. Certain embodiments enable a creator to establish access rights that will allow viewing, annotating, or editing of the documents by one or more reviewers. Further, certain embodiments may include computer executed processes that enable a creator to prevent one or more reviewers from viewing, annotating, editing, saving, or retaining the documents by one or more reviewers. In other aspects, the disclosed embodiments may include computer executed processes that enable creators to grant varying levels of access rights to reviewers, such that certain reviewers may access, review, analyze, modify, comment on, annotate, edit, or otherwise work with a document, and other reviewers may not. In other aspects, the disclosed embodiments may include computer executed processes that enable creators to modify or revoke varying levels of access rights to reviewers, such that certain reviewers may have their rights to access, review, analyze, modify, comment on, annotate, edit, or otherwise work with a document may be modified or totally revoked.

Network 120 may be any type of communication network configured to communicate information in system 100. Network 120 may be a wireless and/or wireline network including one or more components (e.g., hardware, software, and/or firmware) configured to receive, route, translate, and deliver information. For example, network 120 may be the Internet, an Extranet, an Intranet, a Local Area Network, Wide Area Network, etc. that enables clients (or other computer systems) to communicate and collaborate in accordance with aspects of the disclosed embodiments. Network 120 may include infrastructure that implements the communication and collaboration of information over these types of networks, such as routers, bridges, servers, wireless/wireline base stations, transceivers, and related technology. In certain embodiments, network 120 may be separate networks, such that one network connects client 102 to document management platform 110 and another connects one or more of clients 104, 106, 108 to document management platform 110. For example, network 120 may include a local area network, wide area network, portions of the Internet or be totally on the Internet (in a private or public cloud), etc. that provides connections between client 102 and document management platform 110 that are different (in whole or in part) to a local area network, wide area network, portions of the Internet or a private or public cloud (i.e., totally on the Internet), etc. that provides connections between one or more of clients 104, 106, 108, and document management platform 110.

Document management platform 110 may be a system that provides collaboration and other types of information sharing and tracking processes consistent with the disclosed embodiments. In one example, document management platform 110 may be a web-based computing system that interconnects with one or more clients, such as clients 102, 104, 106, and/or 108, over a network, such as network 120 and/or the Internet. In one example, document management platform 110 may include one or more servers and memory storage devices. For instance, document management platform 110 may include one or more computer or data processing devices that have hardware (e.g., one or more processors, storage memory, data buses, network interface, etc.), software (e.g., web browsers, web servers, application programs, operating systems, other executable program code written in any known computing language such as PL/SQL, AJAX, XML, JavaScript™, etc.) and/or firmware (e.g., software embedded in a hardware device). Document management platform 110 may also include one or more memory devices, such as local or networked memory storage media, shared memory platforms, or a combination thereof. In certain embodiments, document management platform 110 includes memory that stores documents, information, content, data, etc. for transmission and viewing by clients 102, 104, 106, and/or 108 through a browser, application, program or similar type of software. In accordance with certain disclosed embodiments, document management platform 110 may temporarily provide access to such information in a virtual memory during communication sessions with a client (e.g., client 102, 104, 106, and/or 108).

Virtual memory may be a physical memory that is configured to temporarily store content (e.g., documents, information, content, data, etc.) that is used by document management platform 110 to provide the content to creators and reviewers via a browser, application, program or similar type of software executed at the creator or reviewer client computer. Document management platform 110 may further be configured to delete the content when a communication session ends with the reviewer computer such that the reviewer computer does not retain copies of the content (including a document) in temporary cache memory of the reviewer client computer's browser. Thus, unlike typical web servers that may load content into a temporary memory on the server that is accessible by users after a communication session ends with the users, document management platform 110 may use a virtual memory dedicated to store content and information associated with a document that is deleted after communication sessions end with users accessing that content and information.

Document management platform 110 may be configured to execute software instructions that performs one or more processes consistent with the disclosed embodiments. For example, document management platform 110 may include computing components that execute and perform processes or operations to track, save, store, and/or retain one or more versions of a document that one or more reviewers have edited, changed, commented on, and/or annotated, and then saved, stored, or retained in a local or non-local memory on a tangible and non-transitory computer readable medium. Document management platform 110 may further execute software instructions that perform collaboration processes that enable clients 102, 104, 106, and/or 108 (and/or their respective users) to share and collaborate on one or more documents.

Figure 2:
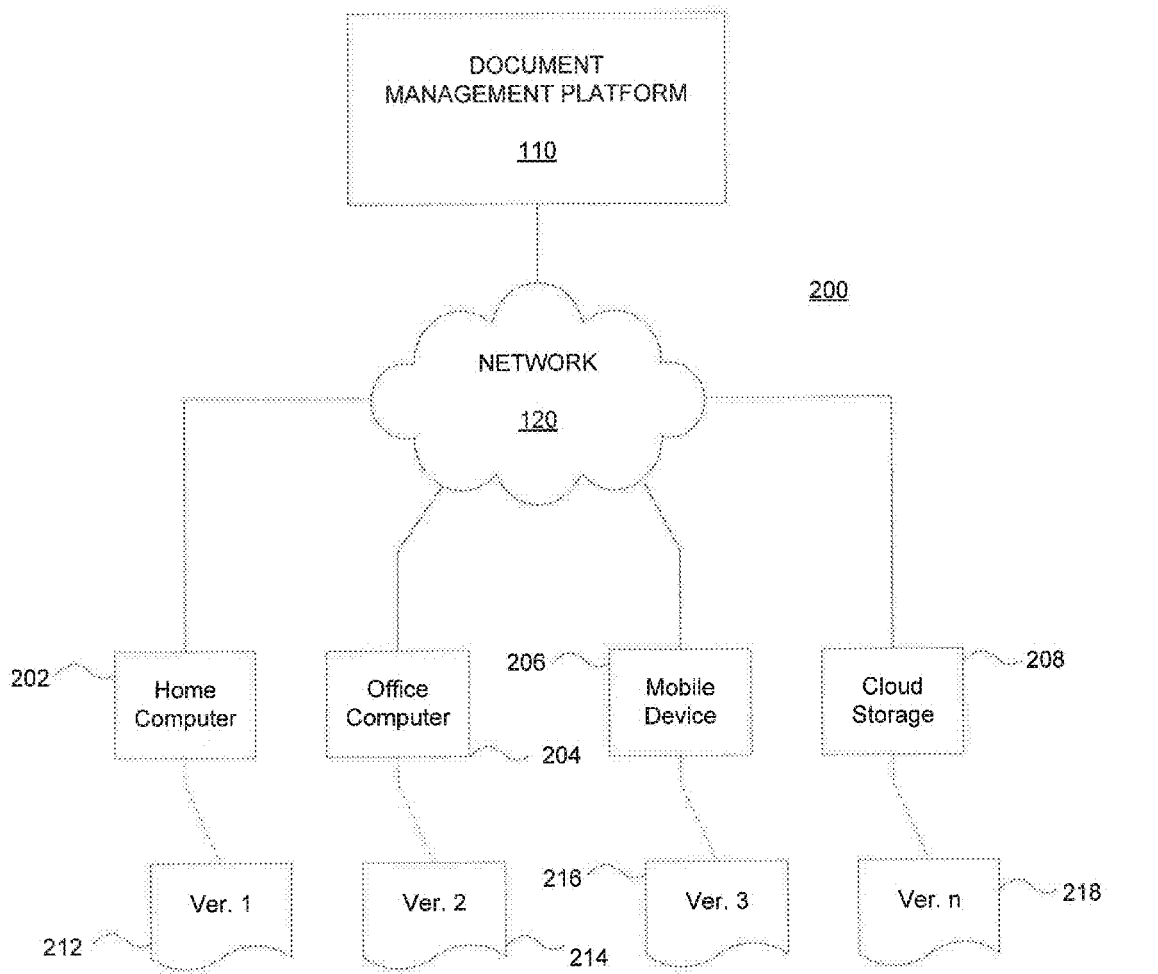
FIG. 2 illustrates an exemplary system environment for implementing certain embodiments.

FIG. 2 illustrates an exemplary system consistent with certain embodiments for managing one or more documents using document management platform 110. In this exemplary system, client devices 202, 204, 206, and/or 208 may be one or more computer systems configured to execute software to create, edit, modify, manage, etc. documents, and send, receive, save, store, and retain one or more documents. For example, client device 202, 204, 206, and/or 208 may be a desktop computer, laptop, PDA, a workstation, tablet, cell phone, smart phone, or any other processor, computer, or device (or group thereof) configured to locally or remotely execute software, send and receive information over a network, such as the Internet, and perform data processing operations. In FIG. 2, illustrating one of many embodiments consistent with the disclosures herein, client device 202 is shown as a home computer, such as a desktop or laptop computer or tablet; client device 204 is shown as an office computer, such as a desktop or laptop computer or tablet; client device 206 is shown as a mobile device, such as a cell phone, smart phone, PDA, or tablet; and client device 208 is shown as any device consistent with the described embodiments connected over a network to a non-local cloud storage medium, such as Google Docs, WorldDox®, NetDocuments®, DropBox, BOX, etc. The illustration, descriptions, functionalities, and operations disclosed in connection with each of clients 202, 204, 206, 208 are also applicable to each other client 202, 204, 206, 208 (or other clients that may be implemented in system 200).

One or more users may operate client device 202, 204, 206, and/or 208 to perform functions consistent with certain embodiments of the disclosed invention. In certain embodiments, client 202, 204, 206, and/or 208 may store and execute software instructions that performs one or more processes that access one or more software applications that work with documents, data, content, or other types of information, and that save, store, and retain such documents, data, content, or other types of information. For example, such software applications may include a word processing application, such as Microsoft Word™, a spreadsheet application, a document management system (DMS) client application, an email application (e.g., Microsoft Outlook™), and/or a document collaboration application, such as Google Docs, Zoho, or a Litera IDS client. Software applications run on client devices 202, 204, 206, 208 may provide different types of features, such as email, document creation and editing, document comparison, PDF processes such as printing extraction, redaction, Bates numbering, binding or editing, web-page related applications, graphical drawing applications, financial service applications, content compare and/or redline applications, etc., without departing from the features of the disclosed embodiments.

In certain embodiments, document management platform 110 may be configured to manage a document created by one or more of clients 102, 104, 106, 108. For example, the document may be created by client 102 or client device 202, or by one or more of clients 104, 106, 108 or client device 204, 206, 208. The document may also be reviewed and edited, changed, modified, commented on, annotated, saved, stored, and retained by one or more of clients 102, 104, 106, 108 or client devices 202, 204, 206, 208. Consistent with certain disclosed embodiments, one version of the document 212 may be stored on a local memory associated with client device 202, another version of the document 214 may be stored on a local or non-local memory associated with client device 204, another version of the document 216 may be stored on a local or non-local memory associated with client device 206, and yet other versions of the document 218 may be stored on a non-local memory associated with client device 208.

In one example, a document version may reflect the state of the document at certain point in time, such as when the document was saved, stored, etc. after creation or modification. For example, version 1 (or a first version) of a document may include content, text, graphics, data, etc. at a certain point in time when that document was created, stored, uploaded, or shared, etc. Version 2 (or a second version) of the document may include content, text, graphics, data, etc. at a certain point in time when that document was created, stored, uploaded, or shared, etc. In certain aspects, different versions of documents (e.g., version 1 and version 2) may include at least some different content, text, graphics, data, metadata, etc. In other aspects, different versions of documents (e.g., version 1 and version 2) may include the same content, text, graphics, data, metadata, etc.

Consistent with certain embodiments, document management platform 110 may monitor and track one or more versions of a document (e.g., document versions 212, 214, 216, 218). For example, document management platform 110 may communicate with and receive versions of a document from client device 202, 204, 206, 208 over network 120. In certain embodiments, a client device or software executed on a client device may be configured to automatically send to platform 110 a version of a document (or content from a version of a document) whenever a user performs a particular type of operation on the version of a document, e.g., upon saving, closing, renaming, converting to a different file type, etc. In other aspects, document management platform 110 may be configured to interface with software executed on a client device (e.g., as an add-in), and, over network 120, request and obtain a version of a document (or content from a document) whenever a user performs a particular type of operation on the version of a document. In still other aspects, a client device 202, 204, 206, 208 and/or document management platform 110 may be configured to interface with each other, and send and receive versions of documents (or content from documents) at predetermined intervals or whenever a shared document is opened and modified by anyone, or queue versions of documents for later sending/receiving whenever a connection to network 120 is interrupted. In certain aspects, the interfacing of document management platform 110 with a client device 202, 204, 206, 208 over network 120 enables platform 110 to receive a version of a document (or content from a document) regardless of the local or non-local storage location of a version of a document selected by a user.

Consistent with certain embodiments, when a document is created by a client 102, document management platform 110 may execute software instructions that create a document log for tracking the initial and later versions of the document. For example, document management platform 110 may communicate with client device 202, 204, 206, 208 over network 120 and may insert an identifier into the first version of a document 212 to assist in tracking later versions of the document and maintaining a document log. In certain aspects, platform 110 may communicate with client device 202 over network 120 and insert an identifier into document 212 before platform 110 receives document 212 from client device 202. In other aspects, platform 110 may communicate with client device 202 over network 120 and insert an identifier into document 212 after platform 110 receives document 212 from client device 202. In still further aspects, platform 110 may communicate with client device 202 over network 120 and insert an identifier into document 212 in response to a user performing a particular type of operation on document 212. In another aspect, a client device (e.g., device 202, 204, 206, 208) may execute software to insert the identifier into the first version of the document 212, either before sending document 212 to platform 110, after sending document 212 to platform 110, or in response to a user performing a particular type of operation on document 212. In other embodiments, document management platform 110 may analyze the information, data, or content of later versions of a document 214, 216, and/or 218, and compare the information, data, or content to that of other documents and versions of documents that it has received, e.g., by comparing to entries for other documents in a document log. Through such comparisons, platform 110 may, in certain aspects, identify, track, and monitor various versions of a document, and maintain an information log for the document. The various mechanisms described for tracking and recognizing different versions of a document are intended as exemplary only, and are not limiting of the scope of the disclosed embodiments.

Consistent with the disclosed embodiments, document management platform 110 may track the different versions of a document regardless of the storage location of any particular version. Consider, for example, client device 202 connected over network 120 to document management platform 110. Client device 202, e.g., a home desktop or laptop computer or tablet, may create a first version of a document 212 and save, store, or retain it in a local memory, such as a local hard drive, RAM, etc. In one embodiment, document management platform 110 may interface with client device 202 over network 120 to insert an identifier into document version 212, create and store in memory a log for the document, and populate an entry in the log for the first version of the document. In a further embodiment, client device 204 may obtain the first version of the document 212, e.g., via email, a transfer via thumb-drive, downloading, via a file-sharing application, such as Google Docs, Zoho, or a Litera IDS, or via a different type of transfer. In such a scenario, client device 204 may review and edit, change, modify, comment on, and/or annotate the first version of the document 212. Following such action(s), client device 204 may save, store, or retain the reviewed version 214 on a local or non-local memory. In one exemplary embodiment, document management platform 110 may then receive the reviewed version 214 (or content from the reviewed version) from client device 204 over network 120, and recognize the reviewed version as a later version of the first version of the document 212, e.g., through the document identifier inserted into the document or by analyzing the information, data, or content of the version reviewed by client device 204 and comparing it to entries stored in a document log for other documents. Document management platform 110 may then generate and populate a second entry in the document log, which corresponds to the second version of the document 214. In another embodiment, client device 206 may obtain either or both of the first version 212 or second version 214 of the document, and proceed to review and edit, change, modify, comment on, and/or annotate the first version 212 or second version 214 of the document. Following such review, client device 206 may save, store, or retain the reviewed version 216 on a local or non-local memory, and document management platform 110 may then recognize the reviewed version as a later version of the document and populate a third entry in the document log, which corresponds to the third version of the document 216. In a still further embodiment, client device 208 may obtain one or more of the prior versions of the document, proceed to review and edit, change, modify, comment on, and/or annotate a prior version of the document, and then save, store, or retain the reviewed version 218 on a non-local memory, such as a cloud document storage memory, e.g., WorldDox®, NetDocuments®, DropBox, BOX, etc. Document management platform 110 may then receive the reviewed version (or content from the reviewed version) from a client device over network 120, and then recognize the reviewed version 218 as a later version of the document (e.g., based on an identifier) and populate an additional entry in the document log corresponding to the later version of the document 218.

Consistent with the embodiments described herein, document management platform 110 may track and monitor different versions of documents, e.g., versions 212, 214, 216, 218 of a document, regardless of the particular reviewer, the type of local or non-local memory storage location, or the types of edits, changes, modifications, comments, or annotations in the different versions of the document. While FIG. 2 illustrates four client devices 202, 204, 206, 208 having particular characteristics, and various versions of a single document, aspects of the disclosed embodiments are not limited to such a configuration, and may, for example, include multiple documents, and more or fewer client devices.

Figure 3A:
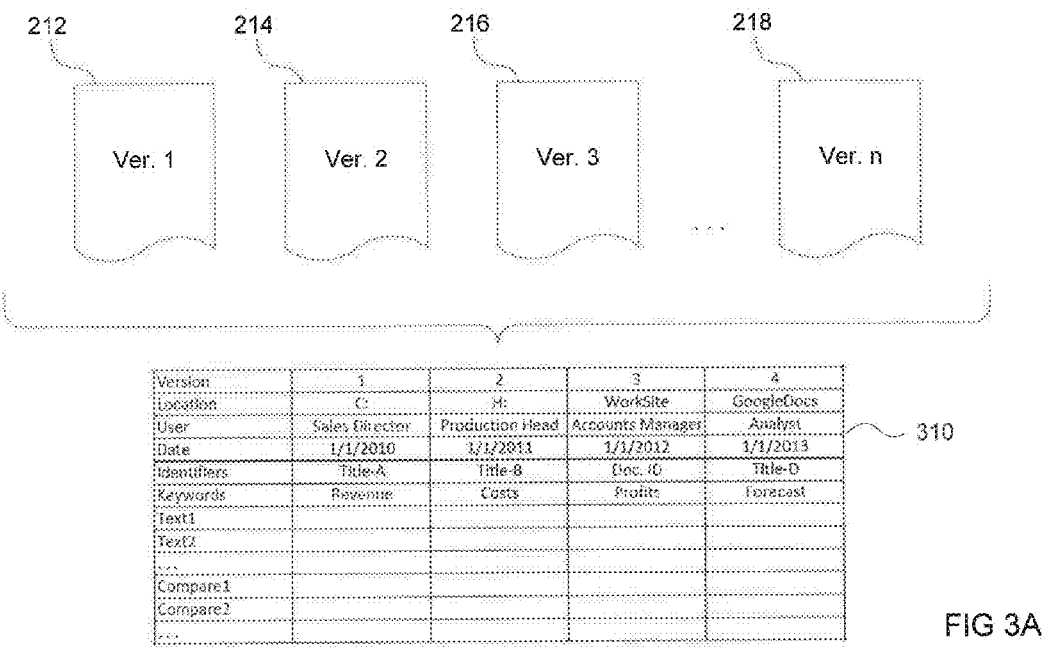
FIG. 3A is a diagram illustrating certain exemplary aspects of the disclosed embodiments.

FIG. 3A is an exemplary diagram showing an exemplary document log 310 consistent with exemplary embodiments. For example, document management platform 110 may create a data structure in a memory reflecting document log 310 that may be used by disclosed embodiments for performing one or more processes consistent with disclosed embodiments. In one example, document management platform 110 may create and store one or more entries in document log 310 corresponding to a different version of a document, e.g., document versions 212, 214, 216, 218. In one embodiment, document management platform 110 may create document log 310 upon the creation of a new document 212 by a user or creator, and populate an initial entry in the document log 310 corresponding to the initial version of the document 212. In another embodiment, document management platform 110 may then receive a reviewed version of a document 214, 216, 218 (or content from a reviewed version) from a client device over network 120, recognize that a user or client device has reviewed and edited, changed, modified, commented on, and/or annotated a prior version of the document, and populate an additional entry in the document log 310 corresponding to the later version of the document 214, 216, 218.

In certain embodiments, document management platform 110 may store information about a document version 212, 214, 216, 218 in document log 310. For example, document management platform 110 may save information regarding the storage location of each version of a document in a document log 310. As another example, document management platform 110 may create and store timestamp information relating to each document version (e.g., the time and/or date when a particular version of a document 212, 214, 216, 218 was created, modified, edited, annotated, commented on, saved, stored, or retained, or the time and/or date of any other type of operation that may be determined by platform 110 or selected by a client or user). As a further example, document management platform 110 may create and store in document log 310 one or more identifiers or unique keywords relating to different versions of a document 212, 214, 216, 218, including the identity of the client or user who generated a particular version of a document. Document management platform 110 may be configured to use the information stored in document log 310 to, for example, track and monitor different versions of documents, and generate and present information that assists users (e.g., reviewer users) in identifying and reviewing different versions of documents.

The disclosed embodiments are not limited by the particular items of information described in connection with document log 310, and one of ordinary skill in the art would recognize that other items of information may be created, tracked, monitored, and stored consistent with the disclosed embodiments.

In certain embodiments, document management platform 110 may store content from a version of a document 212, 214, 216, 218, e.g., text, data, figures, information, etc., in document log 310. For example, in some embodiments document management platform 110 may store in document log 310 certain content that has been modified, edited, annotated, or commented on in a version of a document 212, 214, 216, 218 by a user. In other embodiments, document management platform 110 may store portions of content in different sections of a document log entry, e.g., as shown in one particular arrangement in FIG. 3A with lines titled "Text 1," "Text2," etc. in a document log 310. In certain embodiments, document management platform 110 may store excerpts of content from a version of a document 212, 214, 216, 218, while in other embodiments, document management platform 110 may store the entirety of the content from a version of a document 212, 214, 216, 218, either divided into separate portions, or in a single section of document log 310. Document management platform 110 may be configured to use the stored content from versions of a document (e.g., 212, 214, 216, 218) to enable the tracking and monitoring of different versions of documents, and enable efficient and comprehensive collaboration on such versions of documents by one or more users or clients.

In still other embodiments, document management platform 110 may store comparison data generated by comparing different versions of a document 212, 214, 216, 218. For example, in some embodiments, document management platform 110 may store in document log 310 the content that has been modified, edited, annotated, or commented on in a version of a document 212, 214, 216, 218 by a user, when compared against one or more different versions of the document by a comparison engine. In one aspect, document management platform 110 may execute software processes that perform comparison processes that identify differences between document versions (e.g., redline or blackline changes, etc.). In other aspects, clients 102, 104, 106 and/or 108 (or client devices 202, 204, 206 and/or 208) may execute software instructions that perform comparison processes that identify differences between document versions and provide the comparison information to document management platform 110.

In other embodiments, document management platform 110 may store the entirety of the content from a version of a document 212, 214, 216, 218, with any modifications, edits, annotations, or comments when compared against one or more different versions of the document shown in a redline or other comparison format. In still other embodiments, document management platform 110 may store information regarding the acceptance or rejection of any modifications, edits, annotations, or comments by a reviewer, and may also store information regarding the identity of the reviewer (or client) that originally made the modifications, edits, annotations, or comments, the identity of the reviewer who accepted or rejected such changes, etc. Document management platform 110 may be configured to execute software instructions that use the stored comparison information to enable the tracking and monitoring of different versions of documents and their content, as well as further enabling collaboration on such versions of documents by one or more users or clients.

Figure 3B:
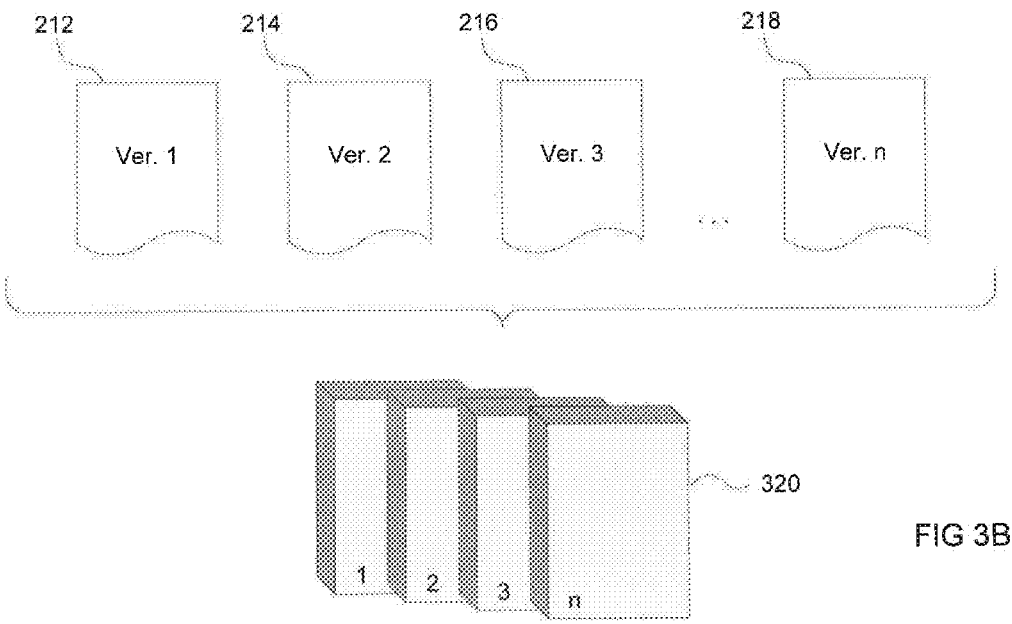
FIG. 3B is a diagram illustrating certain exemplary aspects of the disclosed embodiments.

Whereas FIG. 3A shows a document log 310 having a spreadsheet or table format, the described embodiments are not so limited. For instance, document management platform 110 may be configured to create a data structure to store a document log using other formats, such as linked tables, data records in a database, etc. For example, FIG. 3B shows an exemplary document log 320 that may be organized in an index-card type arrangement. In other embodiments, document log 320 may organize document log entries by saving a full or partial version of a document 212, 214, 216, 218. In these and other embodiments, document management platform 110 may generate and populate entries in a document log 320 to track various items of information about a document about a version of a document, such as the version, storage location, user, date, identifiers, keywords, content, text, comparison data, redline data, and other types of information as may be tracked, monitored, saved, and stored consistent with the embodiments described herein. Thus, an entry in document log 320 may be an index-card type representation of information or a full/partial version of a document, containing one or more such items of information. Although document log 320 is not limited to such arrangements or organizational principles, such formats may also enable the tracking and monitoring of different versions of documents and their content, as well as further enabling collaboration on such versions of documents by one or more users or clients.

Figure 4:
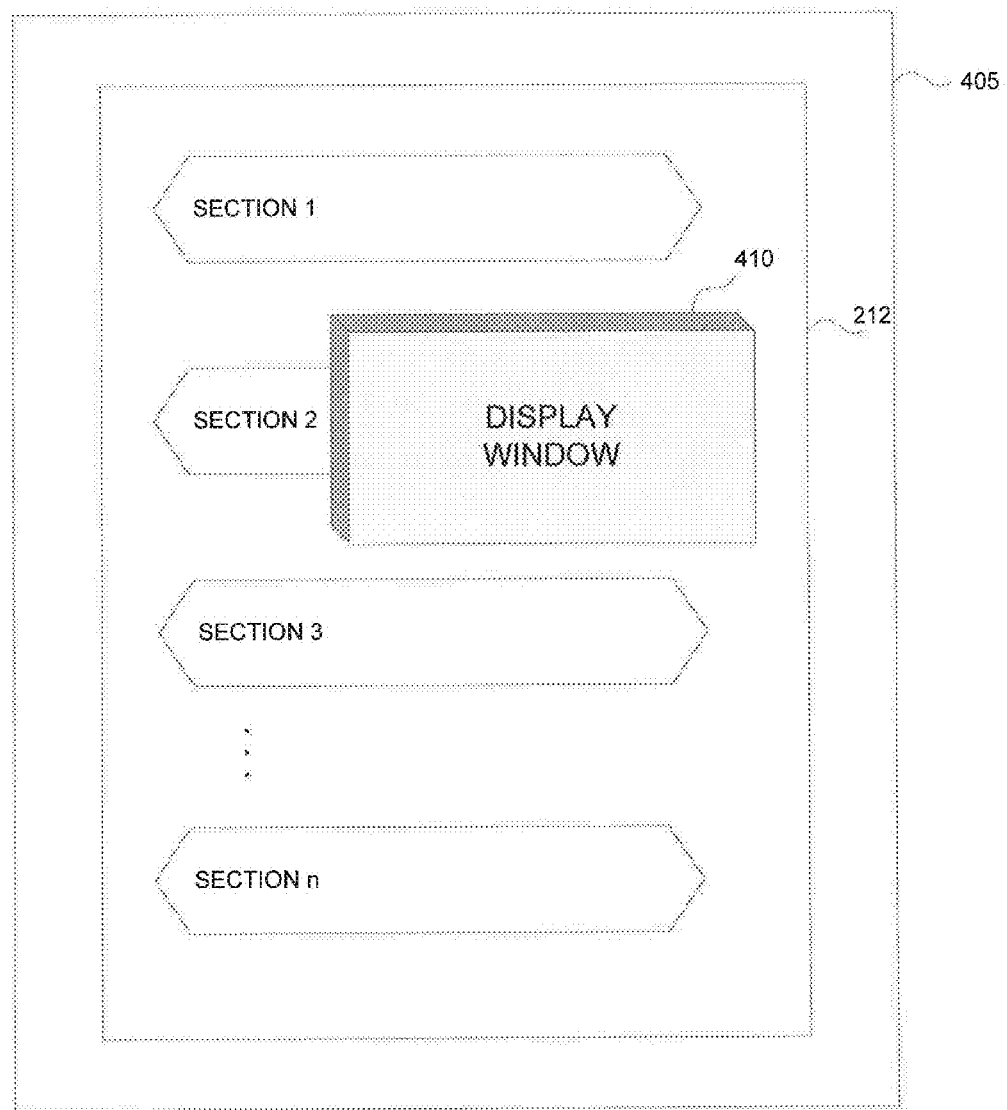
FIG. 4 is a diagram illustrating certain aspects of the disclosed embodiments.

FIG. 4 is a diagram showing an exemplary user interface 405 for viewing, accessing, implementing, and otherwise using information stored by document management platform 110 in a document log 310, 320. In one aspect, the disclosed embodiments may execute software instructions that generate a user interface that presents information on a display screen of a computing device. For example, client 102, 104, 106, or 108 (or client device 202, 204, 206, 208) may execute software instructions that generate one or more interfaces based on information provided by document management platform 110, consistent with the disclosed embodiments. In another embodiment, document management platform 110 may execute software instructions that generate such interface(s) that may be provided to client 102, 104, 106, or 108 (or client device 202, 204, 206, 208).

In certain embodiments, a computing system (e.g., client 102, 104, 106, or 108 (or client device 202, 204, 206, 208)) may execute a software application that may be used by a user (via known user input mechanisms) to open, view, display, and the like, a version of a document 212 (or 214, 216, 218, etc.). The application may, in some embodiments, be a browser application, a word processing application, such as Microsoft Word™, a spreadsheet application, a document management system (DMS) client application, an email application (e.g., Microsoft Outlook™), a document collaboration application, such as Google Docs, Zoho, or a Litera IDS client, and/or any other application capable of displaying content or documents (e.g., including Adobe Flash, Adobe AIR) to a user.

As an example only, document 212 may, consistent with certain embodiments, contain one or more sections (or subsections), e.g., Sections 1-4 as shown in FIG. 4. For example, each section (or subsection) may be a chapter, heading, paragraph, page, word, figure, table, spreadsheet, data entry, or other subdivision of the entirety of the content in document version 212. In certain embodiments, such sections may correspond to sections of an entry in a document log 310, 320 corresponding to a version of a document 212. In other embodiments, such sections may not necessarily correspond to certain sections of an entry in a document log 310, 310 corresponding to a version of a document 212.

In certain aspects, the computing device (e.g., client 102, 104, 106, or 108 (or client device 202, 204, 206, 208)) may execute software instructions that generate a display window 410 within interface 405 to display or show information of a document log 310, 320, which may include entries for other versions (e.g., versions 214, 216, 218) of a document version 212 opened or displayed in interface 405. For example, in some embodiments, display window 410 may be generated by document management platform 110, while in other embodiments, document management platform 110 may interface with the software application executing in the computing device (e.g., client 102, 104, 106, or 108 (or client device 202, 204, 206, 208)) to enable the application to generate and display the display window 410, such as, e.g., through a data-importing function, an add-in, or other such function. A user (via the computing device (e.g., client 102, 104, 106, or 108 (or client device 202, 204, 206, 208)), in some embodiments, may be able to access, activate, etc. display window 410 to show a portion, or the entirety, of a document log 310, 320 containing entries for other versions of the version 212 displayed in interface 405, or to display or show information or content contained in such a document log.

Consistent with certain embodiments, a user (via the computing device (e.g., client 102, 104, 106, or 108 (or client device 202, 204, 206, 208)) may access, activate, or display a display window 410 by clicking with a mouse, for example, by right- or left-clicking to display a list of options and selecting an option to show display window 410. In other embodiments, a user (via the computing device (e.g., client 102, 104, 106, or 108 (or client device 202, 204, 206, 208)) may request, access, activate, display, etc. a display window 410 by hovering a cursor over document version 212 or a section of the document that may be displayed in interface 405. In still other embodiments, a user (via the computing device) may access, activate, display, etc. a display window 410 through other means, such as through highlighting content in document 212 displayed in interface 405 with a mouse, keyboard functions, voice activation and/or recognition applications, or through video/visual applications capable of recognizing a user or client's movements directed towards accessing, activating, displaying, etc. a display window 410.

The disclosed embodiments may be configured to generate and display the display window 410 such that it shows the entirety or a portion of a document log 310, 320, or the entirety or a portion of the information contained in a document log 310, 320. As one example, a user (via the client device (e.g., client 102, 104, 106, or 108 (or client device 202, 204, 206, 208)) may request, access, or activate a display window 410 by, as one option described herein, hovering a cursor over a certain section of document version 212 displayed in application 405. When activated and displayed, display window 410 may display, in certain embodiments, various items of information stored by document management platform 110 in entries in document log 310, 320 for other versions of document version 212, such as the version, storage location, user, date, identifiers, keywords, content, text, comparison data, redline data, and other types of information as may be tracked, monitored, saved, and stored consistent with the embodiments described herein, display window 410 may, in other embodiments, display information in a format that displays only a subset of the information stored in a document log 310, 320, or in a format differs from the format of a document log 310, 320. For example, if a user request or activates display window 410 by, e.g., highlighting a section of content in document version 212 or by hovering a cursor over that section of content, display window 410 may be configured such that it displays corresponding sections of content from other versions of the document 214, 216, 218, as stored within document log 310, 320. In other embodiments, display window 410 may be configured such that it displays comparison information (e.g., redline changes) between a section of content in document version 212 and the corresponding section of content in one or more of versions 214, 216, 218. In still other embodiments, display window 410 may include one or more user-selectable options for viewing information stored in a document log 310, 320. For example, the computing device (e.g., client 102, 104, 106, or 108 (or client device 202, 204, 206, 208)) may execute software instructions consistent with the disclosed embodiments that generate and provide one or more options that a user may select to control how document version information is displayed in display window 410.

Figure 7:
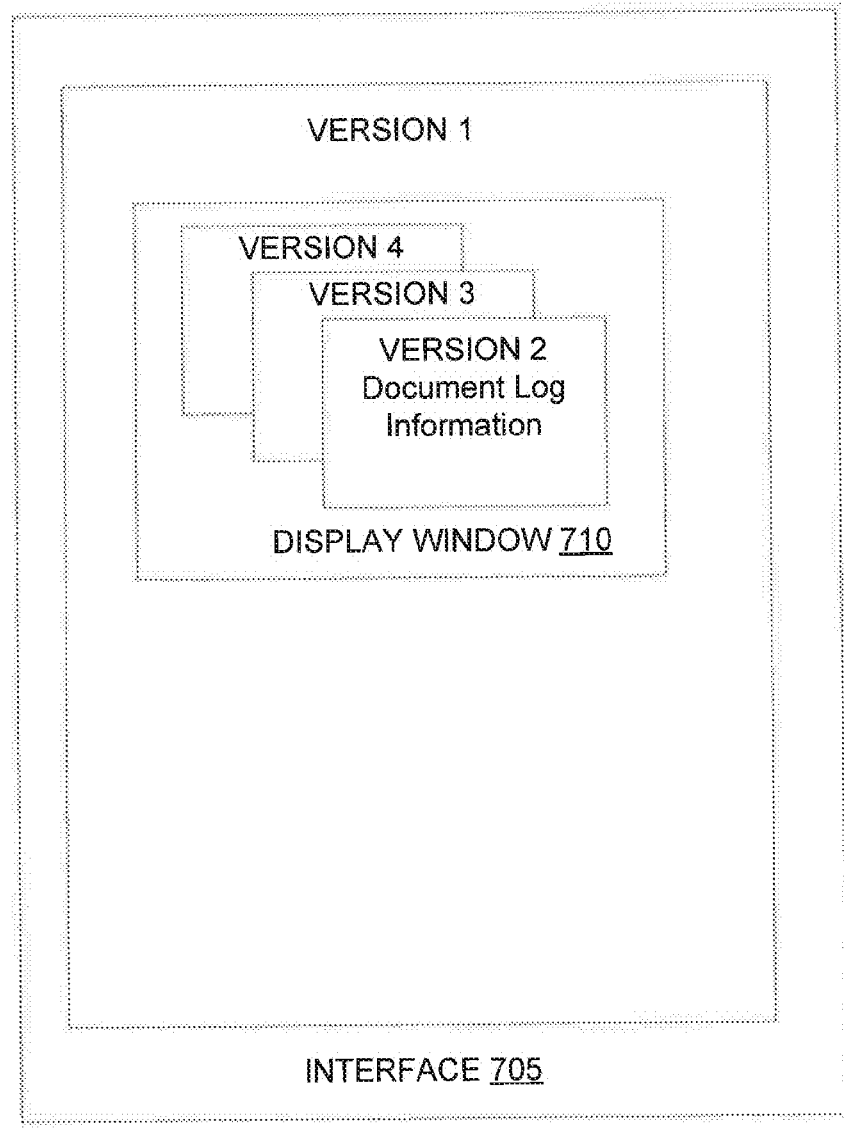
FIG. 7 is a diagram illustrating certain aspects of the disclosed embodiments.

The disclosed embodiments may be configured to render document version information in display window 410 in different formats (which may be user-selectable). For instance, display window 410 may present information in a stacked arrangement (e.g., index-card format), such as that shown in FIG. 7. As shown, exemplary interface 705 may include a representation of a portion of document version 1. Display window 710 may include a stacked arrangement of document log information that includes information associated with document versions 2, 3, and 4. Portions of different versions (e.g., versions 3 and 4) may be viewable. The disclosed embodiments may allow a user (via the computing device (e.g., client 102, 104, 106, or 108 (or client device 202, 204, 206, 208)) to select one or the partially hidden document log information (e.g., version 3 or version 4), to command the computing device to present the selected document log information for the respective version to be presented in the front of the stack (e.g., selected version 4 may be subsequently presented in the front of the stack replacing version 2 document log information)).

In additional embodiments, display window 410 may be configured to include one or more links to one or more versions of a document 212, 214, 216, 218, that, when selected by a user via the computing device, the application executing on the computing device may open and display the content of the selected versions or a section of the selected version of a document 212, 214, 216, or 218.

The disclosed embodiments may be configured to execute software instructions that enable a user to select one or more options, preferences, and/or configurations for displaying document log information in window display 410 (or 710) consistent with the disclosed embodiments. For example, the computing device (e.g., client 102, 104, 106, or 108 (or client device 202, 204, 206, 208)) may execute software instructions that generates an interface that allows a user to select the format for displaying document log information in display window 410 that permits the user to organize and arrange displays of information in display window 410. The implementation of a display window 410 may, consistent with certain embodiments, further enable collaboration on documents by one or more users or clients, by providing information relating to other versions of a document 212, 214, 216, 218.

Figure 5:
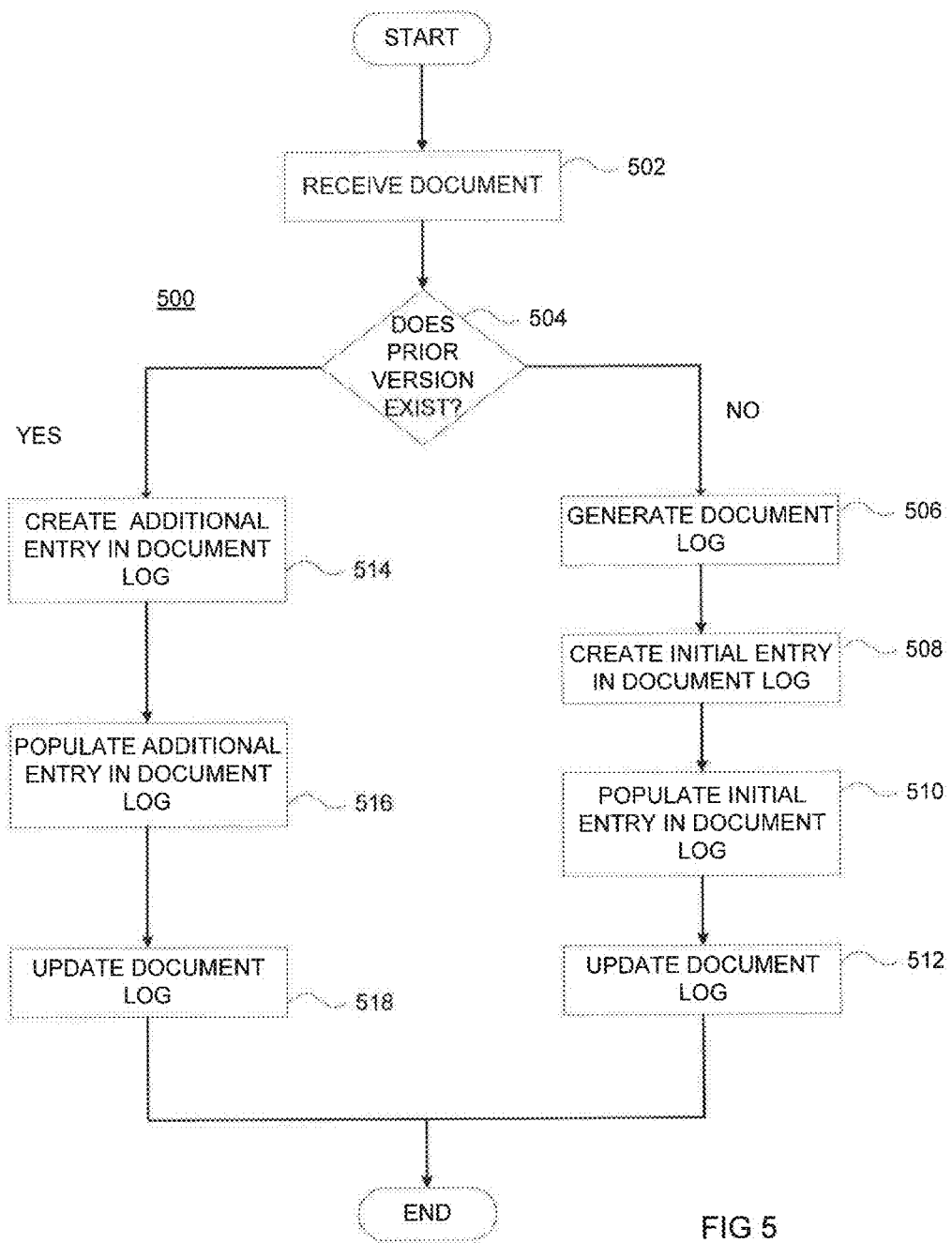
FIG. 5 is a flowchart illustrating an exemplary document management process consistent with certain embodiments.

FIG. 5 is a flowchart illustrating an exemplary process 500 for creating and updating a document log 310, 320 by document management platform 110. In one embodiment, in step 502, a document management platform 110 may receive a document version, content from a document version, or a section of a document version, or content of one or multiple sections from a document version, such as document version 212, 214, 216, 218. In certain embodiments, platform 110 may receive a document version from client 102, 104, 106, or 108 (or client device 202, 204, 206, 208). In other embodiments, platform 110 may be configured to communicate and interface with a client application executing on client 102, 104, 106, or 108 (or client device 202, 204, 206, or 208) in which the document version was created, edited, modified, commented on, annotated, or stored to analyze the document version.

In step 504, platform 110 may determine whether or not a prior version of the document received in step 502 exists. In one aspect, document management platform 110 may determine whether or not a prior version of a document exists by evaluating whether or not the document contains an identifier, such as the document identifier previously disclosed above. In other embodiments, platform 110 may determine whether or not a prior version of a document exists through other mechanisms consistent with the disclosed embodiments, such as by analyzing the information, data, or content received in step 502 to determine whether it is a later version of a document.

If document management platform 110 determines that no prior version exists in step 504, the process may proceed to step 506, where platform 110 may generate a new document log (e.g., 310, 320) for the document or content received in step 502. Platform 110 may be configured to create one or more initial entries in document log 310, 320 for the document version received in step 502 (e.g., Step 508). In step 510, platform 110 may generate and populate information in the initial document log entry, such as the version, storage location, user, date, identifiers, keywords, content, and/or text, and/or other types of information that may be used by the disclosed embodiments to track, monitor, and/or store document version information, consistent with the disclosed embodiments. In one aspect, platform 110 may be configured to execute software instructions that perform one or more operations on a document version, such as extracting data, text, and figures for inclusion in a document log entry, generating and executing known textual searches for keywords, locating user and timestamp information, identifying local and/or non-local storage locations, etc. In another embodiment, platform 110 may be configured to update and store the document log 310, 320 (e.g., step 512). Document management platform 110 may also be configured to execute software instructions that perform an operation on the initial document version to enable it (or another computing system) to recognize future versions of the document, for example, by inserting an identifier into the document version.

Figure 6:
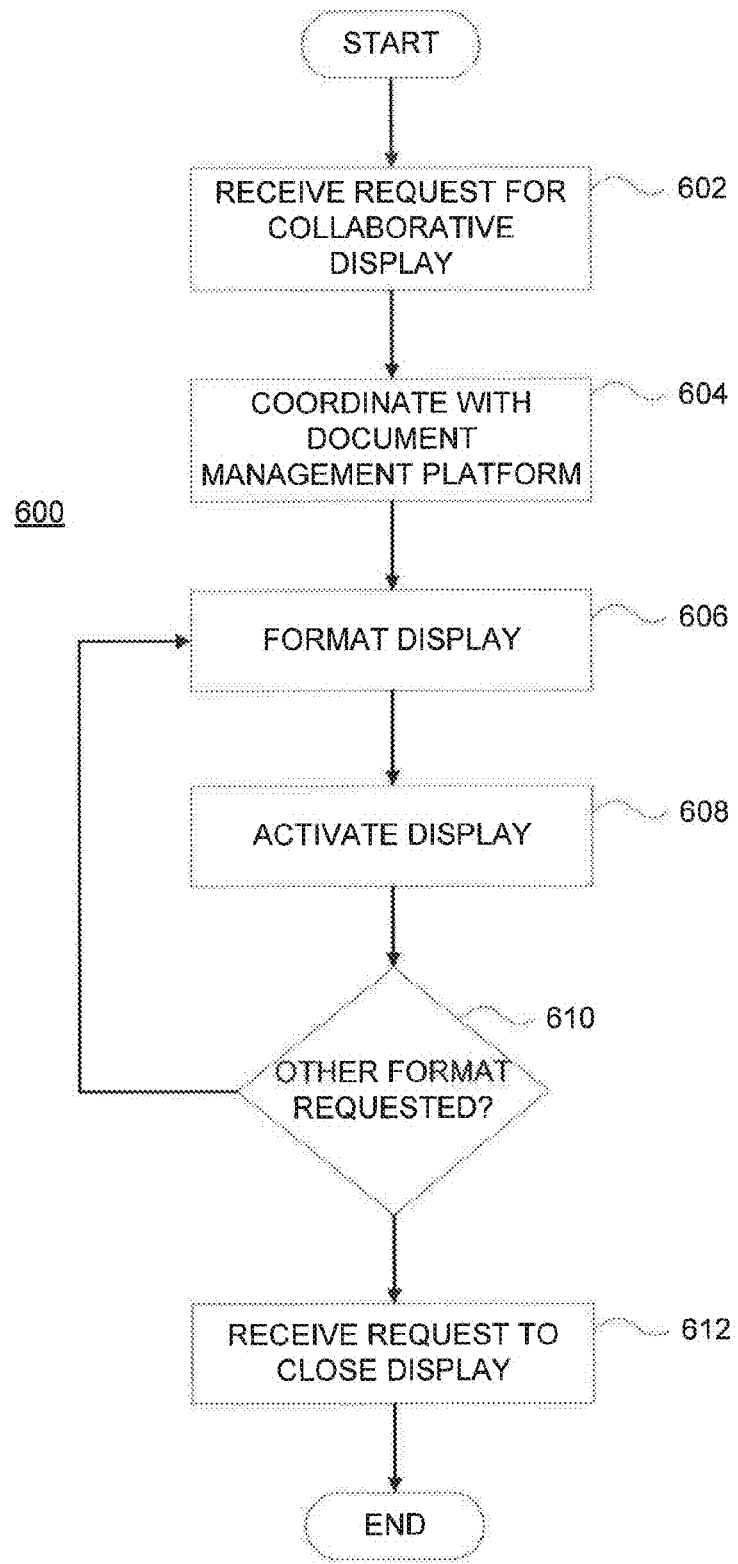
FIG. 6 is a flowchart illustrating an exemplary document review process consistent with certain embodiments.

If, in step 504, document management platform 110 determines that a prior version does exist, the process may proceed to step 514, where platform 110 may create one or more additional entries in a preexisting document log 310, 320 corresponding to the document received in step 502. In step 516, platform 110 may generate and populate information in the additional document log entry or entries, such as the version, storage location, user, date, identifiers, keywords, content, text, comparison data, and/or other types of information that may be used by the disclosed embodiments to track, monitor, and store document version information, consistent with the disclosed embodiments. As described above with respect to step 508, step 516 may similarly involve platform 110 performing one or more operations on a document version. Such operations further include initiating compare and track change (e.g., redline) functions to identify and store a comparison of the edits, changes, annotations, and comments on certain document versions that are different from other document versions. In certain embodiments, platform 110 may be configured to execute software instructions that perform a comparison of the document received in step 502 against an immediately preceding version of the document (e.g., comparison of a version 2 to a version 1 of a document). In other embodiments, platform 110 may be configured to perform a comparison against one or more prior versions of the document (e.g., comparison of version 4 to versions 1-3 of a document or comparison of version 4 to versions 3 and 2 of a document, etc.). In still other embodiments, platform 110 may perform multiple comparisons, such as, for example, comparing the document received in step 502 against each prior version of the document, or against a subset of the prior versions of the document. In certain aspects, platform 110 may be configured to update and store the document log in step 518. In certain aspects, the operation of process 500 may occur entirely transparently to a client or user, FIG. 6 is a flowchart illustrating an exemplary review process 600, consistent with certain disclosed embodiments. Process 600 may be performed by one or more components of system 100 or 200. For example, in one embodiment, a client 102, 104, 106, or 108 (or client device 202, 204, 206, 208) may execute a software application that may receive a request from a user to view a display window (e.g., window 410, 710) containing information relating to other versions of a document (e.g., step 602). For example, consistent with the disclosed embodiments, client 102, 104, 106, or 108 (or client device 202, 204, 206, or 208) may receive the request from a user through input mechanisms, such as the clicking of a mouse, hovering a cursor, highlighting with a cursor text of a document version displayed in an interface (e.g., 405, 705), using a keyboard function, using voice activation/recognition applications and software, or using video/visual, eye or movement recognition applications and software. In other embodiments, a document management platform 110 may receive such a request from a user via client 102, 104, 106, or 108 (or client device 202, 204, 206, or 208). In one embodiment, the software application executed by client 102, 104, 106, or 108 (or client device 202, 204, 206, or 208) to perform such operations may be one or more of a browser application, a word processing application, such as Microsoft Word™, a spreadsheet application, a document management system (DMS) client application, an email application (e.g., Microsoft Outlook™) a document collaboration application, such as Google Docs, Zoho, or a Litera IDS client, and/or any other type of application.

Upon receiving a request, client 102, 104, 106, or 108 (or client device 202, 204, 206, or 208) may coordinate with document management platform 110 in obtaining information regarding other versions of a document (step 604). Consistent with the disclosed embodiments, platform 110 may generate, update, and maintain a document log 310, 320 associated with a document, wherein platform 110 generates and stores one or more items of information for each different version of a document. Such items of information may include, for example, the version, storage location, user, date, identifiers, keywords, content, text, comparison data, redline data, and other types of information as may be tracked, monitored, saved, and stored consistent with the disclosed embodiments. In one embodiment, client 102, 104, 106, or 108 (or client device 202, 204, 206, or 208) may request and obtain the information contained in a document log 310, 320 from document management platform 110. In another embodiment, client 102, 104, 106, or 108 (or client device 202, 204, 206, or 208) may initiate an interaction or connection with document management platform 110, or vice versa, such that platform 110 may provide the information contained in a document log 310, 320.

In step 506, client 102, 104, 106, or 108 (or client device 202, 204, 206, or 208), or document management platform 110 may format a display window (e.g., window 410, 710) to display document version information (e.g., items of information about other versions of a document, such as information originating from a document log 310, 320). Client 102, 104, 106, or 108 (or client device 202, 204, 206, or 208), or document management platform 110 may additionally format a display window (e.g., window 410, 710) to display additional information regarding different versions of a document, such as links to other versions of a document. In certain embodiments, client 102, 104, 106, or 108 (or client device 202, 204, 206, or 208), or document management platform 110, may execute software instructions to establish one or more default formats for organizing the display of information in a display window (e.g., window 410, 710). For example, client 102, 104, 106, or 108 (or client device 202, 204, 206, or 208) may configure and format display window (e.g., window 410, 710) such that it displays only the version numbers and identifiers or other versions of a document. In other aspects, client 102, 104, 106, or 108 (or client device 202, 204, 206, or 208) may also configure and format one or more links to the other versions of a document (e.g., versions 212, 214, 216, 218).

As another example, client 102, 104, 106, or 108 (or client device 202, 204, 206, or 208) may configure and format the display window (e.g., window 410, 710) such that it includes one or more identifiers for the different versions of a document (e.g., timestamp data, user ID, document title, etc.), and also display the text or selections of text from the different versions of a document. As yet another example, client 102, 104, 106, or 108 (or client device 202, 204, 206, or 208) may configure and format the display window to display one or more identifiers for a document, as well as a comparison data (e.g., redline text) showing the differences in a version of a document being reviewed by a client or user, when compared against one or more other versions of the document. As still another example, client 102, 104, 106, or 108 (or client device 202, 204, 206, or 208) may configure and format the display window (e.g., window 410, 710) such that it includes multiple redline texts, showing comparisons against one or more of each other existing version of a document (e.g., versions 212, 214, 216, or 218). As a further example, client 102, 104, 106, or 108 (or client device 202, 204, 206, or 208) may configure and format the display window such that it includes a series of index-type pages or a table of information about different versions of a document, wherein the client or user may select different information to review from within the display window. Other types of formatting information are also consistent with the disclosed embodiments of the present invention.

In certain aspects, client 102, 104, 106, or 108 (or client device 202, 204, 206, or 208) may execute software instructions that enable a user to configure the display window to include the exemplary information described above, or to be formatted in the way disclosed above.

In step 608, client 102, 104, 106, or 108 (or client device 202, 204, 206, or 208), or document management platform 110 may activate a display window, as formatted in step 606. In certain embodiments, the display window may be activated within an application executing on client 102, 104, 106, or 108 (or client device 202, 204, 206, or 208), such that, for example, the display window appears within a web browser, word-processing application, spreadsheet application, collaboration application, etc. In other embodiments, client 102, 104, 106, or 108 (or client device 202, 204, 206, or 208) or document management platform 110 may activate the display window separate from any particular application on a client device that being used to review a document (e.g., client 102, 104, 106, or 108 (or client device 202, 204, 206, or 208)). The display window, e.g., display window 410, 710, may contain various items of information regarding different versions of a document, as described herein.

Moreover, in certain aspects, the display window may contain interactive features, allowing a user or associated client to select from within the display window one or more particular items of information, e.g., text, redline comparisons, document titles, storage location pathways, etc., for closer review by the user. As another example, the display window may show a series of pages or index cards-configured information, each corresponding to a different version of a document, which a user may select. The display window may also contain one or more links to other versions of a document, which may be selected by a user.

In step 610, if a client or user utilizes any such interactive feature, process 600 will return to step 606, and format the display window in accordance with the client's or user's interactive selection. For example, if a user selects text or redline text from within the display window, client 102, 104, 106, or 108 (or client device 202, 204, 206, or 208), or platform 110, may re-format the display window to highlight, zoom-in, scroll-up or scroll-down, and the like, to better display the selected text or redline text. As another example, if a client or user selects one particular page or index card-type information from a series of pages or card-type information originally displayed in the display window in step 608, the disclosed embodiments may reformat the display window to display the requested page or index card-type information. Similarly, if a client or user selects a link to a different version of a document, the disclosed embodiments may reformat the display window 3 to display the content of the requested different version of a document.

Following the formatting step, client 102, 104, 106, or 108 (or client device 202, 204, 206, or 208), or document management platform 110 may activate in step 608 the display window to display the requested information in a re-formatted arrangement. If a client or user wishes to again to utilize any interactive features within a display window, the process 600 may return to step 606.

At some point, such as following the review of a display by a client or user (and any re-formatting or re-activating of a display), client 102, 104, 106, or 108 (or client device 202, 204, 206, or 208), or document management platform 110 may receive a request from the client or user to close the display window (step 612). Consistent with the disclosed embodiments, a client or user may initiate a request to close the display window (e.g., window 410, 710) in any manner similar to the initiation of a request for a display window in step 602. For instance, a client or user may close the window by clicking on or off of the display window with a mouse, by moving the cursor from a hovering position, by removing any highlighting, through a keyboard function, or through the use of an voice activation/recognition, eye or movement recognition application or a video/visual application. Other types of closing a display window may be implemented with the disclosed embodiments.

The disclosed embodiments may be implemented in a variety of contexts. For example, in certain aspects, a system for managing documents over a network may include a storage device storing software instructions and one or more processors configured to execute the software instructions to perform operations consistent with the disclosed embodiments. The one or more processors may receive a first version of a document from a first client. The one or more processors may also create, in a document log, an entry associated with the first version of the document. The document log may contain multiple entries, with each entry corresponding to a different version of the document. The one or more processors may also receive a request from a remote computer (e.g., the first client or a second client different from the first client) that is displaying in an interface a second version of the document, and the request may include a request for information from one or more entries in the document log. The one or more processors may additionally provide to the remote computer, for displaying in a display window in the interface, information from one or more entries in the document log. In certain embodiments, the one or more processors may receive a request from the remote computer to close the display window, and in response to that request, close the display window such that it is no longer displayed in the interface.

In certain aspects, the document log may contain information reflecting one or more differences in content between different versions of a document. For example, entries in the document log may contain redline data indicating one or more redline changes between different versions of a document. In other aspects, the document log may contain redline data indicating the differences between each combination of two different versions of a document. In further aspects, the entries in the document log may identify each existing version of a document, as well as the total number of such versions of a document. In still other aspects, the entries in the document log may identify one or more storage locations of the different versions of a document. In other aspects, the entries in the document log may identify one or more creators of the different versions of a document.

In certain aspects, a user of a remote computer (e.g., a first client, second client, etc.) may initiate a request for information from one or more entries in the document log. In some embodiments, a user may initiate such a request by hovering or clicking a cursor on a version of a document. In other embodiments, a user may initiate such a request by hovering or clicking a cursor on a section of a version of a document.

In still other aspects, a display window may display information from one or more entries in the document log. For example, the display window may display information reflecting one or more differences in content between different versions of a document. In certain aspects, the display window may display redline data indicating one or more redline changes between different versions of a document. In other aspects, the display window may display redline data indicating the differences between each combination of two different versions of a document. In other aspects, the display window may identify each existing version of a document, as well as the total number of such versions of a document. In still other aspects, the display window may identify one or more storage locations of the different versions of a document. In other aspects, the display window may identify one or more creators of the different versions of a document. In certain embodiments, the display window may display a set of comparison pages, wherein each comparison page in the set includes redline data indicating one or more redline changes between one version (or section of the version) of a document and another version (or section of the version) of the document. In certain aspects, the one or more processors in a system consistent with the disclosed embodiments may receive a request from a remote computer to view one or the comparison pages in a set of comparison pages, and display in a display window the comparison page requested by the remote computer.

The disclosed embodiments may also include a computer-implemented process for managing documents. In one embodiment, the process may include receiving a first version of a document from a first client. The process may also include creating an entry associated with the first version of the document in a document log. The document log may contain multiple entries, with each entry corresponding to a different version of the document. The process may further include receiving a request from a remote computer (e.g., the first client or a second client different from the first client) that is displaying in an interface a second version of the document, and the request may include a request for information from one or more entries in the document log. The process may also include providing to the remote computer, for displaying in a display window in the interface, information from one or more entries in the document log. The process may additionally include displaying, in a display window in the interface, information from one or more entries in the document log. The process may further include receiving a request to close the display window, and in response to the request, closing the display window such that it is no longer displayed in the interface. In certain embodiments, the display window may display a set of comparison pages, wherein each comparison page in the set includes redline data indicating one or more redline changes between one version (or section of the version) of a document and another version (or section of the version) of the document. In additional embodiments, the process may include receiving a request from a remote computer to view one or the comparison pages in a set of comparison pages, and displaying in a display window the comparison page requested by the remote computer.

The disclosed embodiments may further include another system for managing documents. The system may include a storage device storing software instructions, and one or more processors configured to execute the software instructions. The one or more processors may provide to a document collaboration platform, a first version of a document. The one or more processors may also display, in an interface, a second version of the document. The one or more processors may also send to the document management platform a request for information from one or more entries in a document log, wherein the document log contains multiple entries, with each entry corresponding to a different version of the document. The process may also include providing to the remote computer, for displaying in a display window in the interface, information from one or more entries in the document log. The one or more processors may further display, in a display window in the interface, information from one or more entries in the document log.

The disclosed embodiments may also include another process for managing documents. In one embodiment, the process may include providing, to a document collaboration platform, a first version of a document. The process may also include displaying, in an interface, a second version of the document. The process may additionally include sending, to the document management platform, a request for information from one or more entries in a document log, wherein the document log contains multiple entries, each entry corresponding to a different version of the document. The process may further include displaying, in a display window in the interface, information from one or more entries in the document log.

The disclosed embodiments may be implemented in a number of environments to facilitate collaborations by one or more clients or users in preparing documents. For example, a client or user may create an initial version of a document and save it in a local or non-local memory. If a client or user saves such a document in a local memory, it and the information it contains will often not be retrievable over a network by a remote collaborator. Moreover, if a client or user were to simply transmit (e.g., via email, file-sharing platform, etc.) an initial version of a document to a collaborator or reviewer, any subsequent edits or changes to a document may not be linked back to the initial version depending on where the edited or changed document is saved by the collaborator/reviewer. A document management platform (e.g., 110), however, may provide mechanisms and processes for better collaboration by monitoring and tracking the various versions of a document, and by saving and storing various items of information contained in and associated with a document in a document log. The document management platform and related processes consistent with the disclosed embodiments may further provide efficient collaboration between clients and users by providing information about other versions of a document in a display window that enables users to view and interact with various items of information, e.g., information about which other versions of a document exist, who created them, when they were created, what content is contained in the other versions, how that content differs from other versions of a document, where those other versions of a document are stored, the format of such other versions of a document, etc. The various embodiments of the present invention accordingly provide for more streamlined, complete, and efficient collaboration between remote clients and users.

Various disclosed embodiments of the present invention may also be implemented in different interactive contexts. For example, certain embodiments may be utilized to streamline medical record sharing, with better tracking and immediate access to information (e.g., via a display window that may be formatted in a 3-D display format, stacked arrangement, hyperlinked arrangement, etc.) that other medical institutions may have locally saved in a remote environment, which would otherwise have been unavailable absent inefficient and lengthy delays from requesting records from another institution and awaiting a response. Such delays may hamper the health care of patients, as they will often need to schedule follow-up appointments due to the delay in sharing medical information, or due to delays in acting on transmitted or shared medical information that is not efficiently tracked and maintained. As disclosed herein, various access-restriction and other security features may be implemented consistent with the disclosed embodiments to protect sensitive information in a medical context and other sensitive contexts. Certain embodiments may also be utilized in an educational context, facilitating teachers and students in sharing ideas and information. Still other embodiments may enable the efficient sharing and review of documents and information by law firms, governmental agencies, and other businesses, as information from other versions of a document are readily available in a display window consistent with the disclosed embodiments during the review of only a single such version of a document. Consistent with certain embodiments, the disclosed invention may also provide and enable various customized and industry-specific templates to further enhance the efficiency and accuracy of collaboration.

In these or any other interactive contexts, multiple document management platforms 110 may be implemented that provide features consistent with the disclosed embodiments between the same or different clients, users, reviewers, creators, and other entities. It is intended that the specification and examples be considered as exemplary only, with a true scope and spirit of the invention being indicated by the following claims.

What is claimed is:

1. A computer-based system for managing documents over a network, comprising:
   a storage device storing software instructions; and
   a memory coupled to one or more processors configured to execute the software instructions to perform operations including:
      receiving a first version of a document from a first client,
      creating, in a document log, an entry associated with the first version of the document, wherein the document log contains multiple entries, each entry corresponding to a different version of the document and identifying the date and storage location of such different version of the document,
      receiving, from a remote computer that is displaying in an interface a second version of the document, a request for information from one or more entries in the document log, wherein the remote computer is the first client or a second client different from the first client, and
      providing to the remote computer, instructions for displaying a display window and information from one or more entries in the document log, wherein the display window is displayed as superimposed over a portion of the interface associated with the one or more entries included in the request for information.

2. The system of claim 1, wherein the entries in the document log contain information reflecting one or more differences in content between different versions of the document.

3. The system of claim 1, wherein the display window displays information reflecting one or more differences in content between different versions of the document.

4. The system of claim 1, wherein the request is initiated by a user on the remote computer hovering or clicking a cursor on a section of the second version of the document.

5. The system of claim 4, wherein the display window displays redline data indicating one or more redline changes between different versions of the section of the second version of the document.

6. The system of claim 1, wherein the display window displays a set of comparison pages, wherein each comparison page in the set includes redline data indicating one or more redline changes between one different version of the document and another different version of the document.

7. The system of claim 6, wherein the one or more processors are further configured to execute the software instructions to perform operations including:
   receiving a request from the remote computer to view one of the comparison pages in the set of comparison pages, and
   displaying in a display window the comparison page requested by the remote computer.

8. A computer-based method for managing documents over a network, comprising:
   providing from a first client, to a document collaboration platform, a first version of a document,
   displaying, in an interface at a remote computer, a second version of the document, wherein the remote computer is the first client or a second client different from the first client,
   sending from the remote computer, to the document management platform, a request for information from one or more entries in a document log, wherein the document log contains multiple entries, each entry corresponding to a different version of the document and identifying the date and storage location of such different version of the document, and
   displaying, in a display window in the interface, information from one or more entries in the document log, wherein the display window is displayed as superimposed over a portion of the interface associated with the one or more entries included in the request for information.

9. The method of claim 8, wherein the entries in the document log contain information reflecting one or more differences in content between different versions of the document.

10. The method of claim 8, wherein the display window displays information reflecting one or more differences in content between different versions of the document.

11. The method of claim 8, wherein the request is initiated by a user hovering or clicking a cursor on a section of the second version of the document displayed in the interface.

12. The method of claim 11, wherein the display window displays redline data indicating one or more redline changes between different versions of the section of the second version of the document.

13. The method of claim 8, wherein the display window displays a set of comparison pages, wherein each comparison page in the set displays redline data indicating one or more redline changes between one different version of the document and another different version of the document.

14. The method of claim 13, wherein the method further comprises:
   initiating a request to view one of the comparison pages in the set of comparison pages, and
   displaying in a display window the comparison page requested by the remote computer.

15. A computer-based method for managing documents over a network, comprising:
   receiving a first version of a document from a first client,
   creating, in a document log, an entry associated with the first version of the document, wherein the document log contains multiple entries, each entry corresponding to a different version of the document and identifying the date and storage location of such different version of the document,
   receiving, from a remote computer that is displaying in an interface a second version of the document, a request for information from one or more entries in the document log, wherein the remote computer is the first client or a second client different from the first client, and
   providing to the remote computer, instructions for displaying a display window and information from one or more entries in the document log, wherein the display window is displayed as superimposed over a portion of the interface associated with the one or more entries included in the request for information.

16. The method of claim 15, wherein the display window displays information reflecting one or more differences in content between the different versions of the document.

\* \* \* \* \*